(12) United States Patent
Beaurepaire

(10) Patent No.: US 9,448,079 B2
(45) Date of Patent: Sep. 20, 2016

(54) METHOD AND APPARATUS FOR PROVIDING NAVIGATION GUIDANCE VIA PROXIMATE DEVICES

(71) Applicant: HERE Global B.V., Veldhoven (NL)

(72) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/619,620

(22) Filed: Feb. 11, 2015

(65) Prior Publication Data

US 2016/0231122 A1    Aug. 11, 2016

(51) Int. Cl.
*G06F 3/01* (2006.01)
*G01C 21/34* (2006.01)

(52) U.S. Cl.
CPC .................... *G01C 21/34* (2013.01)

(58) Field of Classification Search
CPC .......... G01C 21/3438; G01C 21/3688; G01C 21/36; G01C 21/34; G06F 9/4445
See application file for complete search history.

(56) References Cited

U.S. PATENT DOCUMENTS

| 7,286,825 | B2 | 10/2007 | Shishido et al. | |
|---|---|---|---|---|
| 8,364,398 | B2 | 1/2013 | Rossio et al. | |
| 8,577,405 | B2 | 11/2013 | Davis et al. | |
| 2004/0128062 | A1* | 7/2004 | Ogino | G01C 21/26 701/400 |
| 2014/0129136 | A1* | 5/2014 | Celia | G01C 21/00 701/445 |
| 2014/0229110 | A1 | 8/2014 | Slusar | |

FOREIGN PATENT DOCUMENTS

JP    2012-225792 A    11/2012

OTHER PUBLICATIONS

R. Read, "GM's Intriguing New Pedestrian-Detection System Uses Wi-Fi", posted online Jul. 30, 2012, retrieved on Feb. 27, 2015, from http://www.thecarconnection.com/news/1078071_gms-intriguing-new-pedestrian-detection-system-uses-wi-fi, pp. 1-5.

\* cited by examiner

*Primary Examiner* — Yuen Wong
(74) *Attorney, Agent, or Firm* — Ditthavong & Steiner, P.C.

(57) ABSTRACT

An approach is provided for connecting at least one first device with at least one second device proximate to at least one destination for navigation guidance. The approach involves determining at least one destination associated with at least one first device, at least one first user associated with the at least one first device, or a combination thereof. The approach also involves determining at least one second device, at least one second user associated with the at least one second device, or a combination thereof within at least one proximity threshold of the at least one destination. The approach further involves causing, at least in part, a transmission of at least one navigation assistance request from the at least one first device, that least one first user, or a combination thereof to the at least one second device, the at least one second user, or a combination thereof, wherein the at least one navigation assistance request seeks, at least in part, navigation guidance information related to the at least one destination, at least one point of interest associated with the at least one destination, or a combination thereof from the at least one second device, the at least one second user, or a combination thereof.

18 Claims, 13 Drawing Sheets

METHOD AND APPARATUS FOR
PROVIDING NAVIGATION GUIDANCE VIA
PROXIMATE DEVICES

BACKGROUND

Service providers and device manufacturers (e.g., wireless, cellular, etc.) are continually challenged to deliver value and convenience to consumers by, for example, providing compelling network services. One area of interest is in providing local navigation support to users by connecting proximate devices. For example, any obstruction (e.g., ongoing constructions) in the line-of-sight makes it difficult for users to locate their destination despite assistance from navigation and mapping services. Further, the navigation and mapping services may be obsolete and may not accurately represent latest developments in a geographic area (e.g., new lanes, road constructions, etc.). Accordingly, service providers and device manufacturers face significant technical challenges in assisting users in visualizing the environment nearby the destination via proximate devices.

SOME EXAMPLE EMBODIMENTS

Therefore, there is a need for an approach for connecting at least one first device with at least one second device proximate to at least one destination for navigation guidance.

According to one embodiment, a method comprises determining at least one destination associated with at least one first device, at least one first user associated with the at least one first device, or a combination thereof. The method also comprises determining at least one second device, at least one second user associated with the at least one second device, or a combination thereof within at least one proximity threshold of the at least one destination. The method further comprises causing, at least in part, a transmission of at least one navigation assistance request from the at least one first device, that least one first user, or a combination thereof to the at least one second device, the at least one second user, or a combination thereof, wherein the at least one navigation assistance request seeks, at least in part, navigation guidance information related to the at least one destination, at least one point of interest associated with the at least one destination, or a combination thereof from the at least one second device, the at least one second user, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine at least one destination associated with at least one first device, at least one first user associated with the at least one first device, or a combination thereof. The apparatus is also caused to determine at least one second device, at least one second user associated with the at least one second device, or a combination thereof within at least one proximity threshold of the at least one destination. The apparatus is further caused to cause, at least in part, a transmission of at least one navigation assistance request from the at least one first device, that least one first user, or a combination thereof to the at least one second device, the at least one second user, or a combination thereof, wherein the at least one navigation assistance request seeks, at least in part, navigation guidance information related to the at least one destination, at least one point of interest associated with the at least one destination, or a combination thereof from the at least one second device, the at least one second user, or a combination thereof.

According to another embodiment, a computer-readable storage medium carries one or more sequences of one or more instructions which, when executed by one or more processors, cause, at least in part, an apparatus to determine at least one destination associated with at least one first device, at least one first user associated with the at least one first device, or a combination thereof. The apparatus is also caused to determine at least one second device, at least one second user associated with the at least one second device, or a combination thereof within at least one proximity threshold of the at least one destination. The apparatus is further caused to cause, at least in part, a transmission of at least one navigation assistance request from the at least one first device, that least one first user, or a combination thereof to the at least one second device, the at least one second user, or a combination thereof, wherein the at least one navigation assistance request seeks, at least in part, navigation guidance information related to the at least one destination, at least one point of interest associated with the at least one destination, or a combination thereof from the at least one second device, the at least one second user, or a combination thereof.

According to another embodiment, an apparatus comprises means for determining at least one destination associated with at least one first device, at least one first user associated with the at least one first device, or a combination thereof. The apparatus also comprises means for determining at least one second device, at least one second user associated with the at least one second device, or a combination thereof within at least one proximity threshold of the at least one destination. The apparatus further comprises means for causing, at least in part, a transmission of at least one navigation assistance request from the at least one first device, that least one first user, or a combination thereof to the at least one second device, the at least one second user, or a combination thereof, wherein the at least one navigation assistance request seeks, at least in part, navigation guidance information related to the at least one destination, at least one point of interest associated with the at least one destination, or a combination thereof from the at least one second device, the at least one second user, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for connecting at least one first device with at least one second device proximate to at least one destination for navigation guidance are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
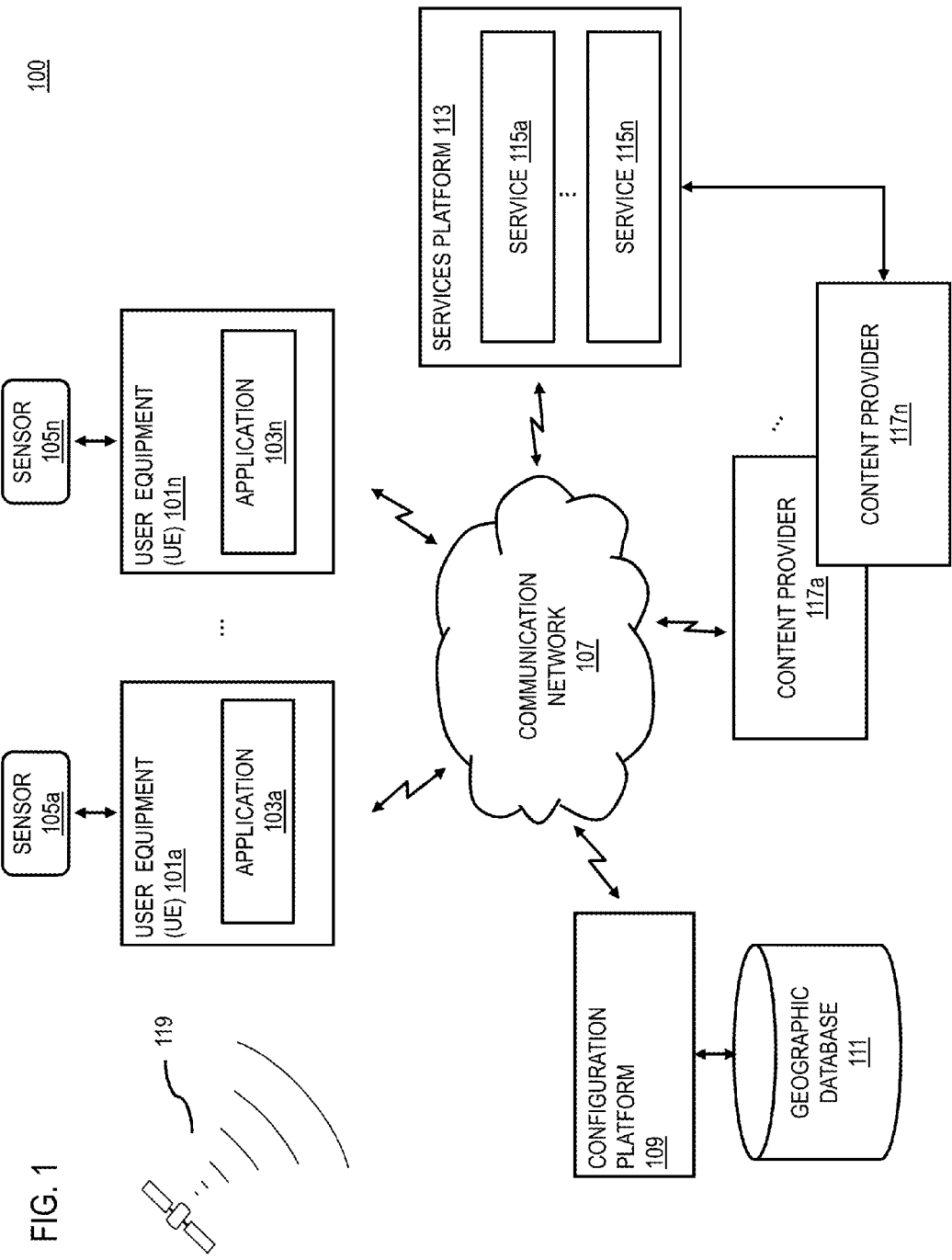
FIG. 1 is a diagram of a system capable of connecting at least one first device with at least one second device proximate to at least one destination for navigation guidance, according to one embodiment.

FIG. 1 is a diagram of a system capable of connecting at least one first device with at least one second device proximate to at least one destination for navigation guidance, according to one embodiment. The mapping and navigation services rely upon drivers to manually input their destination before directing a vehicle towards a destination. Though a calculated route is displayed, a driver may still miss the destination if he/she is unfamiliar with the area nearby the destination. Further, the mapping and navigation services may not accurately represent latest road changes or developments. This results in traffic jams as users are confused regarding the route to their destination. Hence, drivers require support in physically finding their destination and recommendations on proper parking space while traveling through unfamiliar areas.

To address this problem, a system 100 of FIG. 1 introduces the capability wherein at least one user approaching at least one destination may get support from other users (e.g., pedestrians) located next to the destination. In one scenario, the system 100 provides local navigational support by connecting at least one driver to at least one pedestrian proximate to at least one destination. In another scenario, the system 100 provides local navigational support by connecting at least one pedestrian to at least one other pedestrian proximate to at least one destination. In a further scenario, the system 100 provides local navigational support by connecting at least one vehicle with at least one other vehicle proximate to at least one destination. Since, local guides can provide dynamic and accurate information (e.g., route towards a destination, main entrance towards a destination, availability of parking spaces, area to avoid when arriving or leaving, and any other relevant information regarding guidance, etc.) based, at least in part, on their line-of-sight, the drivers have a better sense of directions.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a configuration platform 109 via the communication network 107. In one embodiment, the configuration platform 109 performs one or more functions associated with connecting at least one first device with at least one second device proximate to at least one destination for navigation guidance.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be a vehicle (e.g., autonomous vehicles, highly-assisted vehicles (HAD), a mobile device (e.g., phone), and/or a combination of the two. In one embodiment, the UE 101 maybe embedded in the at least one vehicle.

By way of example, the applications 103 may be any type of application that is executable at the UE 101, such as mapping application, location-based service applications, navigation applications, content provisioning services, camera/imaging application, media player applications, social networking applications, calendar applications, search applications, vehicle control applications, and the like, or any combination thereof. In one embodiment, one of the applications 103 at the UE 101 may act as a client for the configuration platform 109 and perform one or more functions associated with the functions of the configuration platform 109 by interacting with the configuration platform 109 over the communication network 107. In one scenario, applications 103 may interface with the sensors 105 and/or the services platform 113 via the communication network 107 for connecting at least one first device with at least one second device proximate to at least one destination for navigation guidance.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis), an audio recorder for gathering audio data, acceleration sensor (e.g., an accelerometer can measure acceleration and can be used to determine orientation of the vehicle, and the like. In a further example embodiment, sensors about the perimeter of the vehicle may detect the relative distance of the vehicle from lane or roadways, the presence of other vehicles, pedestrians, traffic lights, and any other objects, or a combination thereof. In one example embodiment, the UE 101 may include GPS receivers to obtain geographic coordinates from satellites 119 for determining current location and time associated with the UE 101 and/or a vehicle. Further, the location can be determined by a triangulation system such as A-GPS, Cell of Origin, or other location extrapolation technologies.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof. In one example embodiment, In one embodiment, the configuration platform 109 may be a platform with multiple interconnected components. The configuration platform 109 may include multiple servers, intelligent networking devices, computing devices, components and corresponding software for connecting at least one first device with at least one second device proximate to at least one destination for navigation guidance. In addition, it is noted that the configuration platform 109 may be a separate entity of the system 100, a part of the one or more services 115a-115n (collectively referred to as services 115) of the services platform 113, or included within the UE 101 (e.g., as part of the applications 103).

In one embodiment, the configuration platform 109 may determine at least one destination associated with at least one request. Then, the configuration platform 109 may determine one or more devices and/or users within certain proximity threshold of the at least one destination. Subsequently, the configuration platform 109 may cause a transmission of navigation assistance request to the determined proximate devices and/or users. In one example embodiment, driver Tom approaches nearby his destination, however proximate areas around the destination is under construction, and this latest development is not reflected by his mapping and navigation services. Since the construction is obstructing Tom's line-of-sight, he may activate local support (i.e., a feature of being connected with other users nearby the destination). Then, the configuration platform 109 may search for users nearby the destination. The configuration platform 109 may send the request (e.g., a specific request for route towards a specific destination and a parking space) to one or more nearby users based on a selection criterion. One of the selected user Sam who happens to be in front of the destination agrees to support Tom for a given time. Subsequently, the configuration platform 109 may cause an exchange of information between Tom and Sam. For example, the UE 101 of Sam may receive pictures of Tom's car alongside other identification information (e.g., model number, color, license plate, etc.). Similarly, the UE 101 of Tom may receive Sam's position information, his picture and possibly one recognizable item he is wearing/carrying. In one scenario, Tom may identify Sam, and may be guided by Sam via gestures and/or any other form of notifications towards the destination. In another scenario, Sam may highlight the route and/or its details, specify and/or propose a new destination or one or more route segments (e.g., route that Tom should choose and route that Tom should avoid) towards the destination in his UE 101, whereupon the configuration platform 109 may transmit this information to UE 101 of Tom.

In one embodiment, the configuration platform 109 may automatically extract navigation information stored in the UE 101 of at least one user (e.g., a proximate user had previously assisted a driver to the similar destination), and may transmit the navigation guidance information to a user driving towards a destination. Such automated process may be activated based, at least in part, on vehicle speed level, user behavioral patterns, or a combination thereof. In a further embodiment, the configuration platform 109 may extract static information (e.g., vehicle number, vehicle color, etc.) directly from the geographic database 111 and/or UE 101.

In one embodiment, the geographic database 111 may store routing information to at least one destination, identification information for one or more users and/or one or more vehicles, speed information for one or more vehicles, speed limit for one or more road links, route information towards at least one destination, or a combination thereof. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the configuration platform 109 and the content provider 117 to supplement or aid in the processing of the content information.

By way of example, the services 115 may be an online service that reflects interests and/or activities of users. The services 115 allow users to share location information, activities information (e.g., travel plans, speed information), contextual information, historical user information (e.g., travel history) and interests within their individual networks, and provides for data portability. The services 115 may additionally assist in providing the configuration platform 109 with profile information (e.g., pictures, any other personal information) on at least one user.

The content providers 117a-117n (collectively referred to as content provider 117) may provide content to the UE 101, the configuration platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. In one scenario, the content provider 117 may provide content that may aid in the processing of location information for one or more vehicles and/or one or more users. In another scenario, the content provider 117 may provide content that may aid in the processing of identification information for one or more vehicles and/or one or more users. In one embodiment, the content provider 117 may also store content associated with the UE 101, the configuration platform 109, and the services 115 of the services platform 113. In another embodiment, the content provider 117 may manage access to a central repository of data, and offer a consistent, standard interface to data, such as, a repository of location information, identification information, navigation information, other traffic information, etc. Any known or still developing methods, techniques or processes for retrieving and/or accessing location information, identification information, navigation information, other traffic information, etc. from one or more sources may be employed by the configuration platform 109.

By way of example, the UE 101, the configuration platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. In another embodiment, the configuration platform 109, the services platform 113, and/or the content provider 117 can be combined in a same entity.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
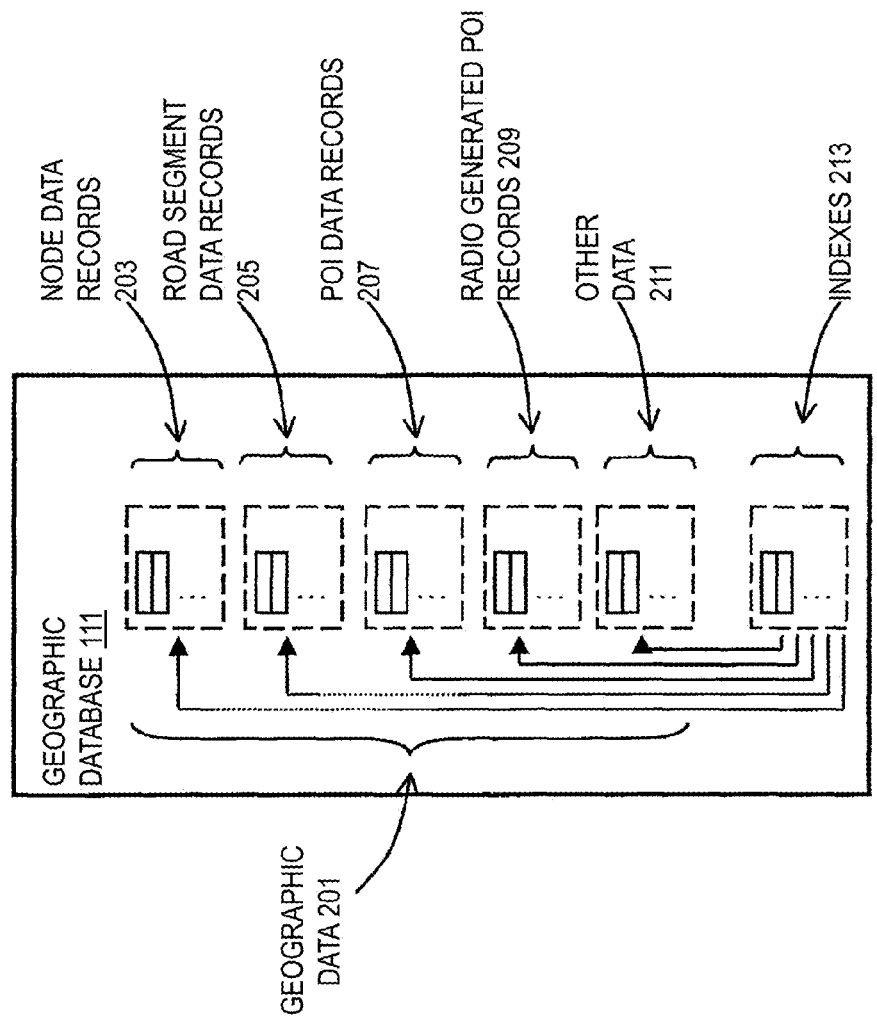
FIG. 2 is a diagram of the geographic database 111 of system 100, according to exemplary embodiments.

FIG. 2 is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic database 111 includes geographic data 201 used for (or configured to be compiled to be used for) mapping and/or navigation-related services, such as for personalized route determination, according to exemplary embodiments. For example, the geographic database 111 includes node data records 203, road segment or link data records 205, POI data records 207, radio generated POI records 209, and other data records 211, for example. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for determination of one or more personalized routes, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 207. The geographic database 111 can also include data about places, such as cities, towns, or other communities, and other geographic features, such as bodies of water, mountain ranges, etc. Such place or feature data can be part of the POI data records 207 or can be associated with POIs or POI data records 207 (such as a data point used for displaying or representing a position of a city). In addition, the geographic database 111 can include data from radio advertisements associated with the POI data records 207 and their respective locations in the radio generated POI records 209. By way of example, a street is determined from the user interaction with the UE 101 and the content information associated with UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UE 101) to provided navigation-related functions. For example, the geographic database 111 can be used with the end user device UE 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of route information to at least one destination, according to exemplary embodiments.

Figure 3:
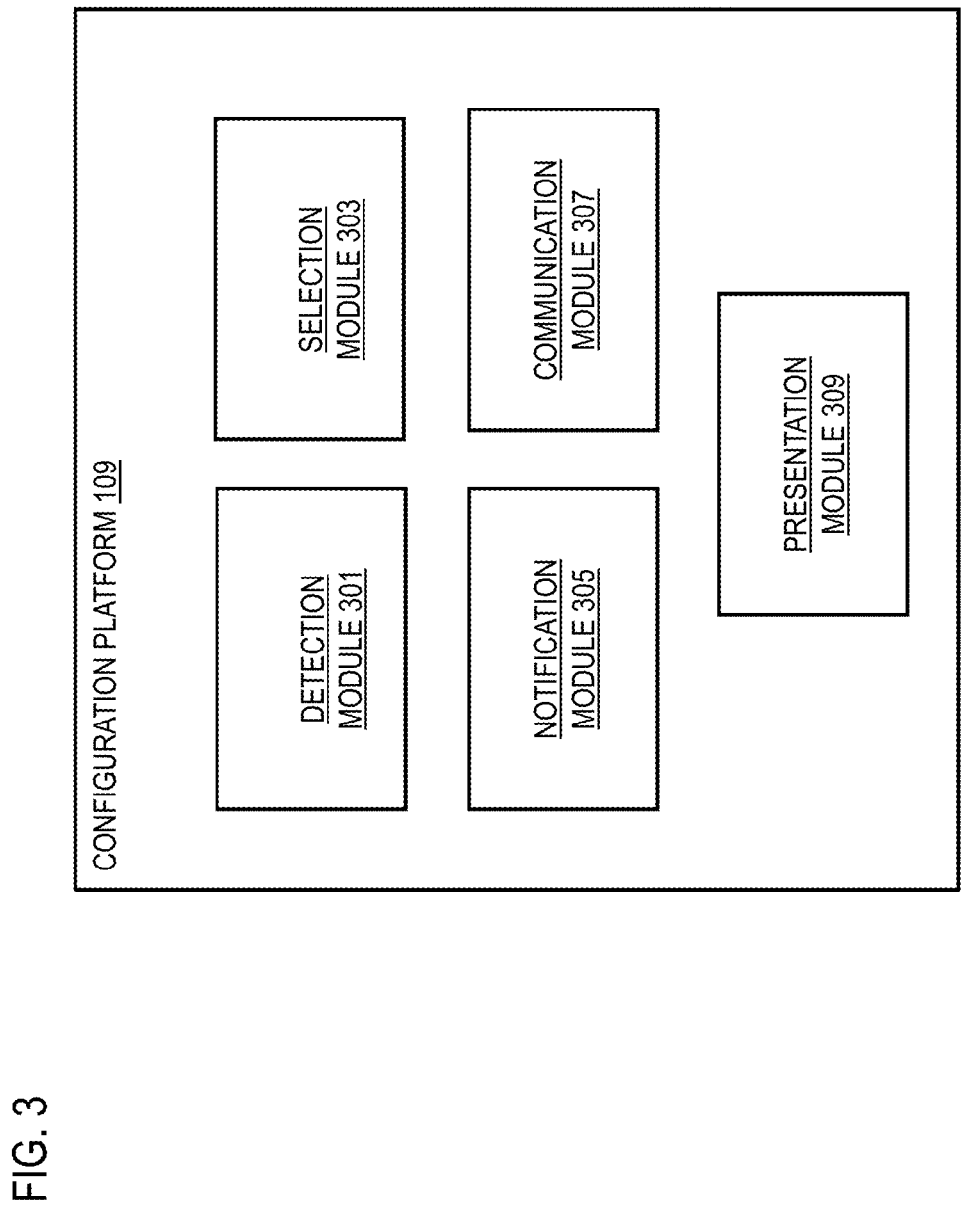
FIG. 3 is a diagram of the components of the configuration platform 109, according to one embodiment.

FIG. 3 is a diagram of the components of the configuration platform 109, according to one embodiment. By way of example, the configuration platform 109 includes one or more components for connecting at least one first device with at least one second device proximate to at least one destination for navigation guidance. It is contemplated that the functions of these components may be combined in one or more components or performed by other components of equivalent functionality. In this embodiment, the configuration platform 109 includes a detection module 301, a selection module 303, a notification module 305, a communication module 307 and a presentation module 309.

In one embodiment, the detection module 301 may detect at least one UE 101 associated with at least one pedestrian, at least one vehicle, or a combination thereof nearby the at least one destination associated with at least one request. Subsequently, the detection module 301 may calculate location information (e.g., proximity information, position information), relevancy information, or a combination thereof for the at least one pedestrian, the at least one vehicle, or a combination thereof. In another embodiment, the detection module 301 may also detect a gesture-based input, for example, pre-stored action patterns of raising a hand, pointing of a UE 101 towards a particular direction, in addition to the relative position information. In a further embodiment, the detection module 301 may detect speed level of at least one vehicle, driving patterns of at least one user (e.g., user head movements, etc.), or a combination thereof.

In one embodiment, the selection module 303 may select at least one UE 101 for navigation guidance based, at least in part, on the location information, the relevance information, or a combination thereof received from the detection module 301. In one scenario, the selection module 303 may select at least one user based on the user's familiarity with the area. In another scenario, the selection module 303 may select at least one user based on the number of navigational assistance provided to other users. In a further scenario, the selection module 303 may select at least one user based on unobstructed line-of-sight towards at least one destination.

In one embodiment, the notification module 305 may provide route recommendations (e.g., visual notification, audio notification, gesture notification, etc.) towards at least one destination in at least one UE 101 of request sending users. In another embodiment, the notification module 305 may provide movement instructions, recommendations to at least one suitable parking area, or a combination thereof. In a further embodiment, the notification module 305 may alert at least one guiding user (e.g., pedestrian) to gesticulate at a specific time period (e.g., an exact time when a request sending user is looking at the guiding user).

In one embodiment, the communication module 307 enables formation of a session over a communication network 107 by implementing various protocols and data sharing techniques for enabling collaborative execution between the configuration platform 109 and the one or more UE 101s. In one scenario, the communication module 307 may establish a communication session between at least one request sending UE 101 and at least one navigation guiding UE 101 detected within a close proximity of at least one destination. In another scenario, the communication module 307 may establish inter-vehicle communication session between at least one request sending vehicles (e.g., autonomous vehicles, HAD, advanced driver assistance systems (ADAS), etc.) and other vehicles detected within close proximity of at least one destination for navigational purposes. The communication module 307 makes pedestrian to pedestrian interaction, driver to driver interaction, vehicle to vehicle interaction, and vehicle to pedestrian interaction feasible for navigational purposes.

In one embodiment, the presentation module 309 obtains a set of summary statistics from the other modules. Then, the presentation module 309 continues with generating a presentation corresponding to the request of the at least one user. In one scenario, the presentation module 309 may cause a presentation of highlighted road segments for indicating at least one destination, at least one parking area, at least one busy road segment, or a combination thereof. In another scenario, the presentation module 309 may cause a presentation of identification information for at least one request sending vehicle (e.g., picture of the vehicle, model number of the vehicle, color information, etc.). In a further scenario, the presentation module 309 may cause a presentation of identification information for at least one navigation guiding user (e.g., pictures, distinguishable attires, etc.).

The above presented modules and components of the configuration platform 109 can be implemented in hardware, firmware, software, or a combination thereof. Though depicted as a separate entity in FIG. 1, it is contemplated that the configuration platform 109 may be implemented for direct operation by respective UE 101. As such, the configuration platform 109 may generate direct signal inputs by way of the operating system of the UE 101 for interacting with the applications 103. In another embodiment, one or more of the modules 301-309 may be implemented for operation by respective UEs, as a configuration platform 109, or combination thereof. Still further, the configuration platform 109 may be integrated for direct operation with the services 115, such as in the form of a widget or applet, in accordance with an information and/or subscriber sharing arrangement. The various executions presented herein contemplate any and all arrangements and models.

Figure 4:
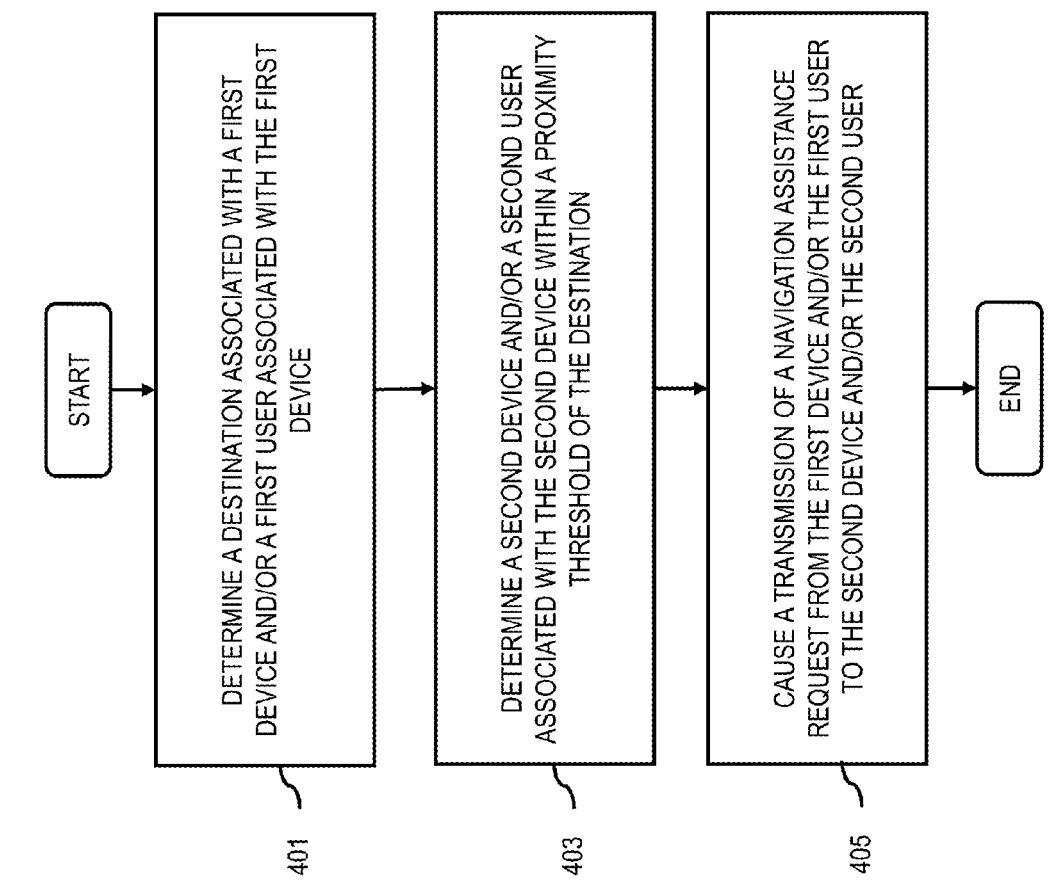
FIG. 4 is a flowchart of a process for transmission of navigation request to one or more devices proximate to a destination for navigation guidance, according to one embodiment.
Figure 12:
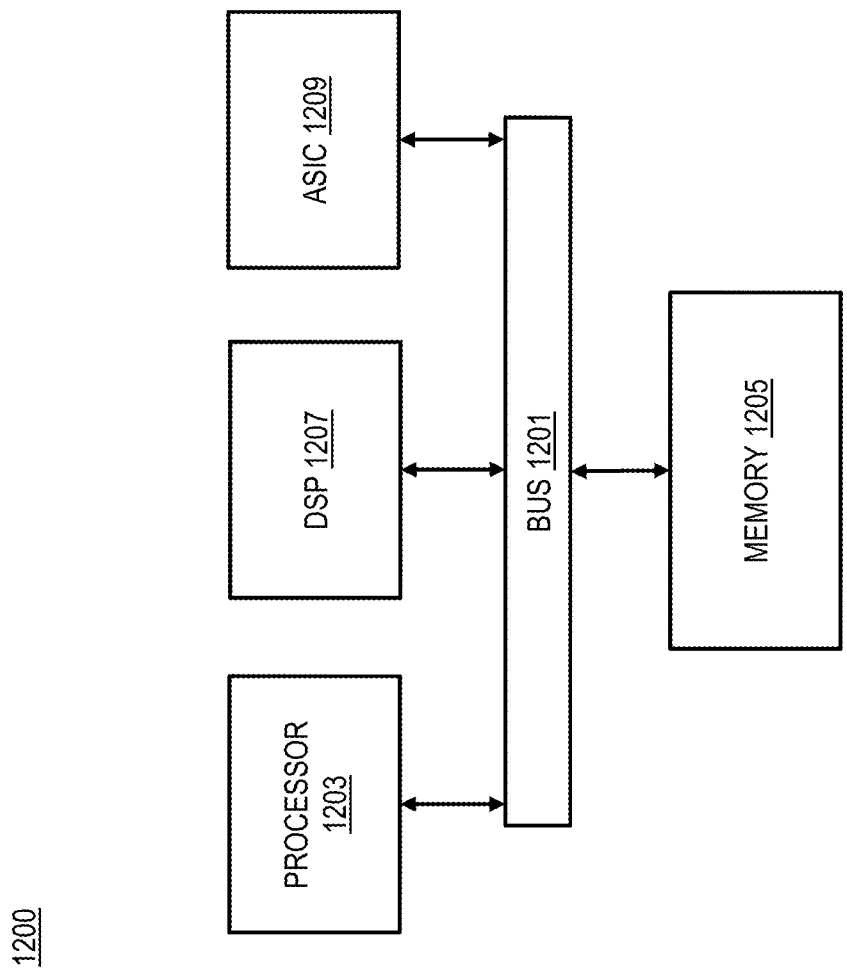
FIG. 12 is a diagram of a chip set that can be used to implement an embodiment of the invention.

FIG. 4 is a flowchart of a process for transmission of navigation request to one or more devices proximate to a destination for navigation guidance, according to one embodiment. In one embodiment, the configuration platform 109 performs the process 400 and is implemented in, for instance, a chip set including a processor and a memory as shown in FIG. 12.

In step 401, the configuration platform 109 may determine at least one destination associated with at least one first device, at least one first user associated with the at least one first device, or a combination thereof. As discussed, the last mile in an unfamiliar area is often the most difficult because routes towards a destination can be confusing and finding parking spaces can be arduous. Hence, user may send a navigation assistance request with destination/location information whereupon the configuration platform 109 may determine the destination/location associated with the request to detect proximate devices for navigation guidance.

In step 403, the configuration platform 109 may determine at least one second device, at least one second user associated with the at least one second device, or a combination thereof within at least one proximity threshold of the at least one destination/location. In one embodiment, one or more devices and/or vehicles may be synced and/or paired via cloud but pairing between the request sending device and the device of a local helper may alternatively happen through local connectivity (e.g., near-field communication) as the driver comes closer to the destination. In one scenario, the configuration platform 109 may select at least one proximate device based, at least in part, on the proximity of the request sending device from the at least one destination. In another scenario, the configuration platform 109 may select at least one proximate device based, at least in part, on the unobstructed line-of-sight.

In step 405, the configuration platform 109 may cause, at least in part, a transmission of the at least one navigation assistance request from the at least one first device, that least one first user, or a combination thereof to the at least one second device, the at least one second user, or a combination thereof. In one embodiment, the at least one navigation assistance request seeks, at least in part, navigation guidance information related to the at least one destination/location, at least one point of interest associated with the at least one destination/location, or a combination thereof from the at least one second device, the at least one second user, or a combination thereof. The navigation guidance information includes, at least in part, an exact or specified location of the at least one destination, at least one main entrance of the at least one destination, at least one parking location associated with the at least one destination, at least one area to avoid when arriving at or leaving the at least one destination, at least one parking area to avoid at the at least one destination, one or more highlighted route segments and/or its details, specification and/or proposal for a new destination/location or one or more route segments, or a combination thereof. In another embodiment, the at least one navigation assistance request includes, at least in part, first identification information associated with the at least one first device, the at least one first user, or a combination thereof. The first identification information includes descriptive text, one or more images, or a combination thereof of the at least one first device, the at least one first user, at least one first vehicle associated with the at least one first user, or a combination thereof. In a further embodiment, at least one response, i.e., the navigation guidance information, to the at least one navigation assistance request includes, at least in part, second identification information associated with the at least one second device, the at least on second user, or a combination thereof. The second identification information includes descriptive text, one or more images, or a combination thereof of the at least one second device, the at least one second user, at least one second vehicle associated with the at least one first user, or a combination thereof. In one embodiment, the at least one navigation assistance request may be sent at the time when a first navigation instruction request is received by the configuration platform 109 from the at least one first device or the least one first user, or a combination thereof. Alternatively, the at least one navigation assistance request may be sent by the at least one first device or the least one first user, or a combination thereof. Alternatively, the at least one navigation assistance request may be sent when the at least one first device or the least one first user, or a combination thereof, is within a threshold distance from the destination/location.

Figure 5:
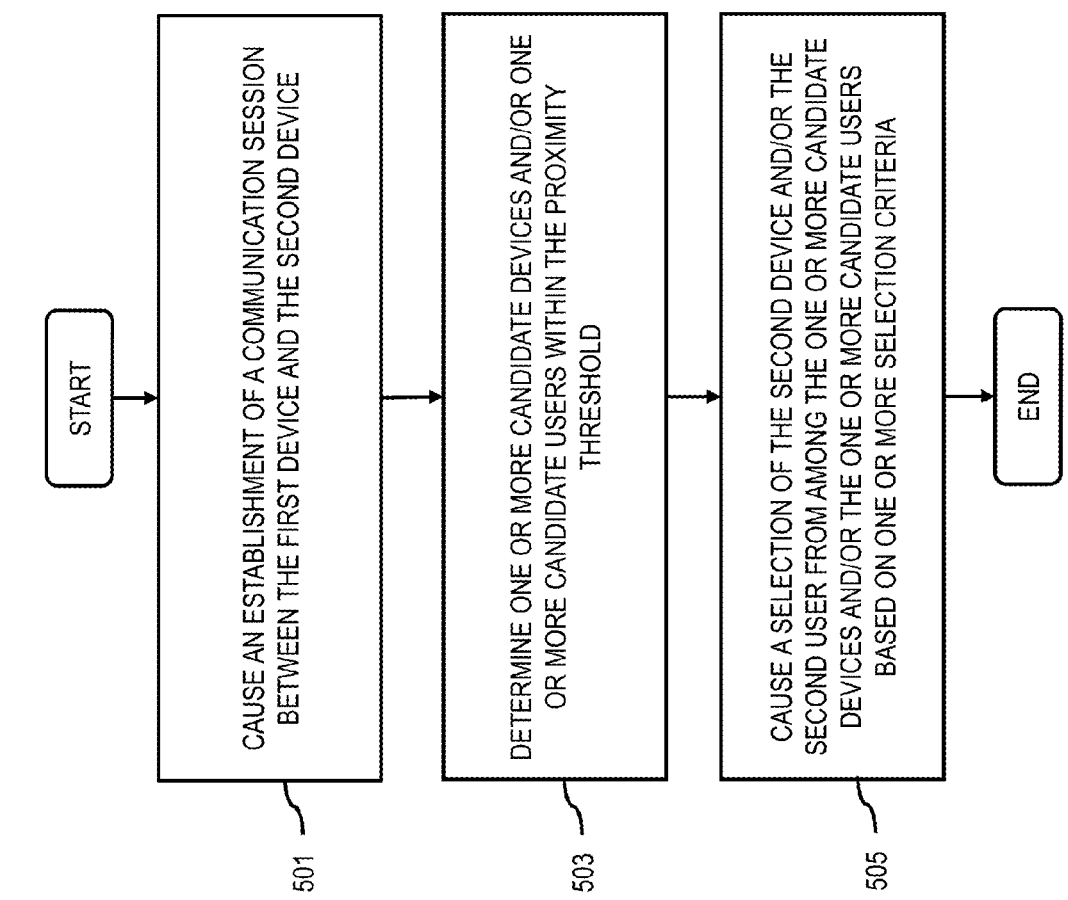
FIG. 5 is a flowchart of a process for selecting at least one device and/or at least one user for navigation guidance from the one or more proximate devices and/or users based on selection measures, according to one embodiment.

FIG. 5 is a flowchart of a process for selecting at least one device and/or at least one user for navigation guidance from the one or more proximate devices and/or users based on selection measures, according to one embodiment. In one embodiment, the configuration platform 109 performs the process 500 and is implemented in, for instance, a chip set including a processor and a memory as shown in FIG. 12.

In step 501, the configuration platform 109 may cause, at least in part, an establishment of at least one communication session between the at least one first device and the at least one second device. The at least one communication session is for conveying the navigation guidance information; for identifying the at least one first device, the at least one first user, the at least one second device, the at least one second user, or a combination thereof. In one embodiment, the navigation guidance information is at least one shared mapping user interface including, at least in part, information annotated by the at least one first device, the at least one first user, the at least one second device, the at least one second user, or a combination thereof. In another embodiment, the at least one communication session is established using local connectivity, wide area connectivity, or a combination thereof.

In step 503, the configuration platform 109 may determine one or more candidate devices, one or more candidate users, or a combination thereof within the at least one proximity threshold within the destination/location. In one scenario, when a user (e.g., a driver) makes a request for getting navigational support, e.g., the at least one navigation assistance request, the configuration platform 109 initiates looking for devices associated with at least one user and/or at least one vehicle around the selected destination/location. The configuration platform 109 may send notifications to the most relevant devices. In one scenario, relevancy can be sorted by proximity criterion, wherein a device closest to the destination/location, and/or with an unobstructed line-of-sight, may be selected over other devices.

In step 505, the configuration platform 109 may cause, at least in part, a selection of the at least one second device, the at least one second user, or a combination thereof from among the one or more candidate devices, the one or more candidate users, or a combination thereof based, at least in part, on one or more selection criteria. In one embodiment, the one or more selection criteria include, at least in part, the proximity criterion, a previous experience criterion, an area familiarity criterion, or a combination thereof. In one scenario, when a user (e.g., a pedestrian) makes the request of getting navigational support towards a destination/location, the configuration platform 109 may detect devices associated with pedestrians and/or vehicles nearby the destination. The configuration platform 109 may select one or more devices based, at least in part, on the number of times a user has assisted other users in the past, the familiarity of a user with the destination area, or a combination thereof. Then, the configuration platform 109 may send notifications to the most relevant devices.

Figure 6:
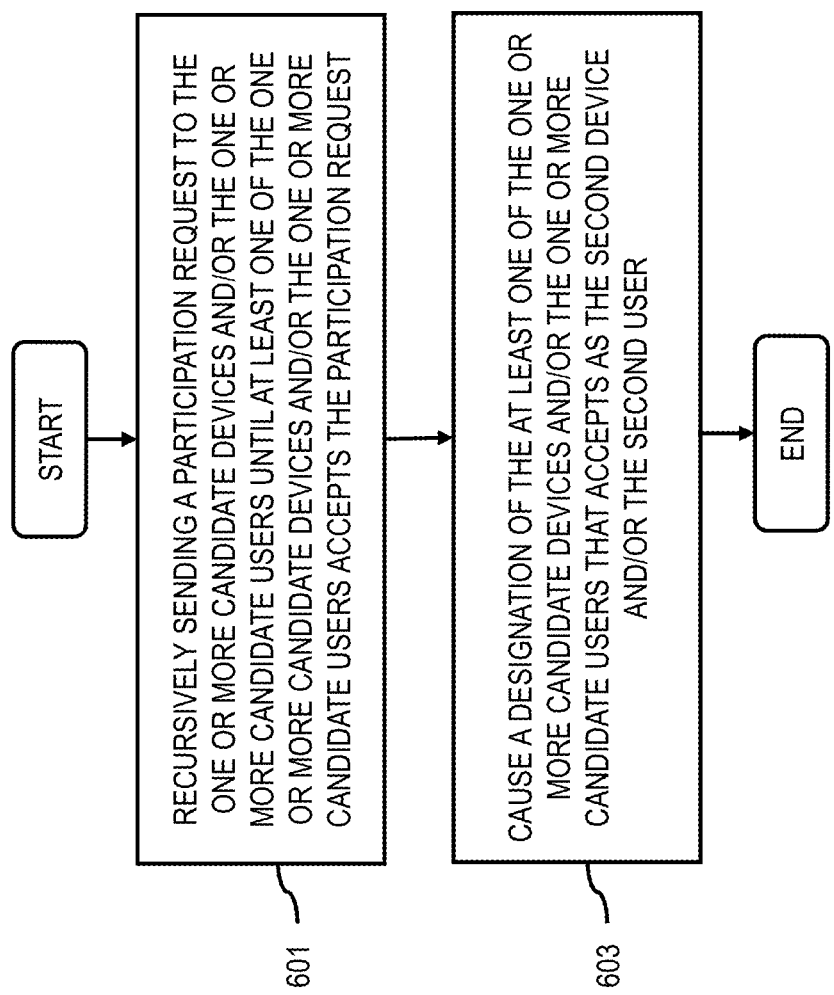
FIG. 6 is a flowchart of a process for designating at least one device and/or at least one user as a navigation guide, according to one embodiment.

FIG. 6 is a flowchart of a process for designating at least one device and/or at least one user as a navigation guide, according to one embodiment. In one embodiment, the configuration platform 109 performs the process 600 and is implemented in, for instance, a chip set including a processor and a memory as shown in FIG. 12.

In step 601, the configuration platform 109 may recursively send at least one participation request to the one or more candidate devices, the one or more candidate users, or a combination thereof until at least one of the one or more candidate devices, the one or more candidate users, or a combination thereof accepts the at least one participation request. In one scenario, if at least one device associated with the selected pedestrian and/or vehicles accepts the navigation request, then the configuration platform 109 may stop sending notifications to one or more devices of other pedestrians and vehicles proximate to the at least one destination. In another scenario, if at least one selected device associated with a pedestrian and/or a vehicle refuses the navigation request, the configuration platform 109 may continue to send notifications to one or more other devices associated with pedestrians and vehicles proximate to the at least one destination. The notification may be sent until at least one notified device accepts the navigation request. In one example embodiment, the one or more users consenting to guide a request sending user may receive monetary (e.g., credit points) and/or non-monetary (points to be assisted by other users in future) rewards.

In step 603, the configuration platform 109 may cause, at least in part, a designation of the at least one of the one or more candidate devices, the one or more candidate users, or a combination thereof that accepts as the at least one second device, the at least one second user, or a combination thereof. In one scenario, if multiple users and/or vehicles are available to provide navigational guidance to the request sending user (e.g., a driver), then the configuration platform 109 may enable a request sending driver and/or other passengers in the vehicle to have several channels of discussions open to deal with the questions and answers.

Figure 7:
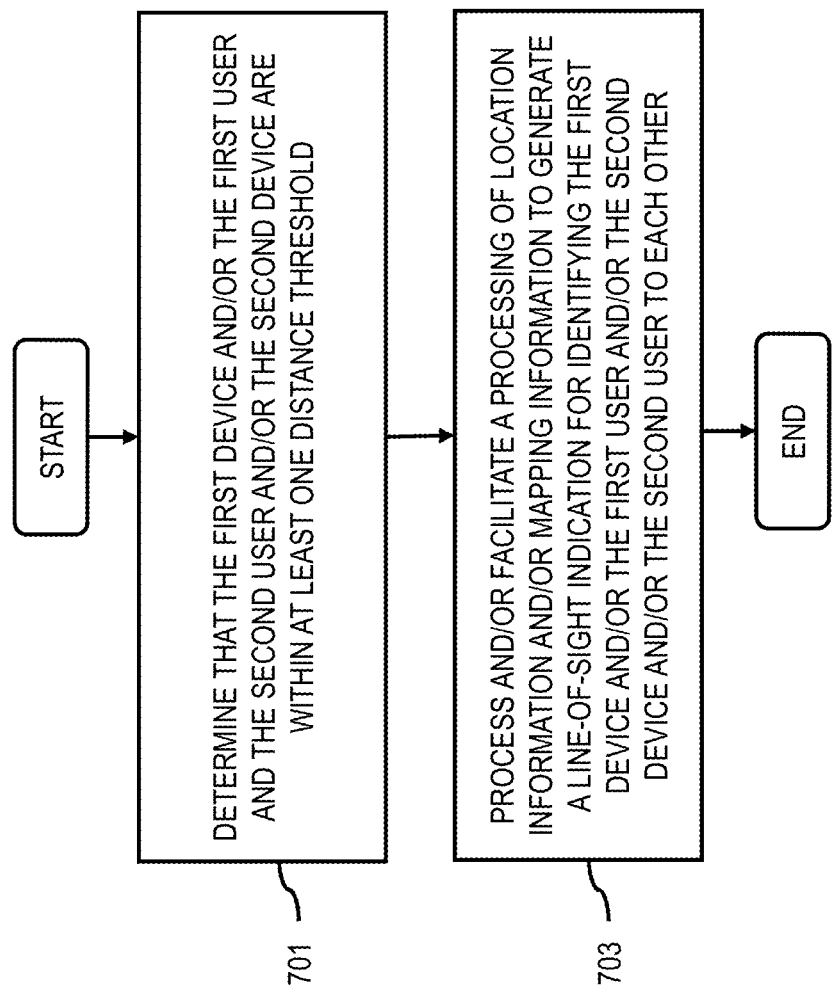
FIG. 7 is a flowchart of a process for determining distance threshold and line-of sight between one or more devices, according to one embodiment.

FIG. 7 is a flowchart of a process for determining distance threshold and line of sight between one or more devices, according to one embodiment. In one embodiment, the configuration platform 109 performs the process 700 and is implemented in, for instance, a chip set including a processor and a memory as shown in FIG. 12.

In step 701, the configuration platform 109 may determine that the at least one first device, the at least one first user, or a combination thereof and the at least one second user, the at least one second device, or a combination thereof are within at least one distance threshold. In another embodiment, location information of the at least one first device, the at least one first user, or a combination thereof, may be frequently sent/updated to the at least one second device, the at least one second user, or a combination thereof, while the at least one first device, the at least one first user is moving/approaching the destination/location. Additionally, location information of the selected at least one second device, the at least one second user, or a combination thereof, maybe frequently sent/updated to the at least one first device, the at least one first user, or a combination thereof, while the at least one second device, the at least one second user is moving. Additionally, the sent/updated location information may be displayed in the at least one first device and/or the at least one second device. Further, the configuration platform 109 may be implemented in the at least one first device and/or the at least one second device.

In step 703, the configuration platform 109 may process and/or facilitate a processing of location information of the at least one first device, the at least one first user, the at least one second device, the at least one second user, mapping information, or a combination thereof to generate at least one line-of-sight indication for identifying the at least one first device, the at least one first user, the at least one second device, the at least one second user, or a combination thereof to each other. In one scenario, a line-of-sight indication may be prompted at at least one second device when the request sending user is looking at the navigation guiding user. For example, the configuration platform 109 may take into consideration windshield reflections while determining a clear line-of-sight. In another scenario, a line-of-sight indication may be prompted at at least one second device when the request sending user is looking at his/her UE 101. In an alternative scenario, the line-of-sight indication may be prompted at the display of the at least one second and/or first devices, when the devices are within a threshold distance from each other and/or the unobstructed line-of-sight is detected between the devices. Additionally, the line-of-sight information can be presented on a map presentation and/or augmented reality presentation of the at least one second or first device. Further, the line-of-sight information can be an arrow, or similar, presented on the display of the respective first or second device, indication of a direction of a sight towards the respective first or second device. Alternatively, the line-of-sight information can be a line drawn between the positions of the respective first or second device. Further, a line can be drawn between the location of the second device and the destination/location, and be displayed in the first device. The display can be a head-up display (HUD), embedded dashboard display, or user device display. Additionally, the line-of-sight information can be a voice command/prompt indicating the location and/or direction of the at least one respective second or first device, and/or second or first user. This voice command/prompt can be presented additionally to a navigation voice command/prompt.

Figure 8:
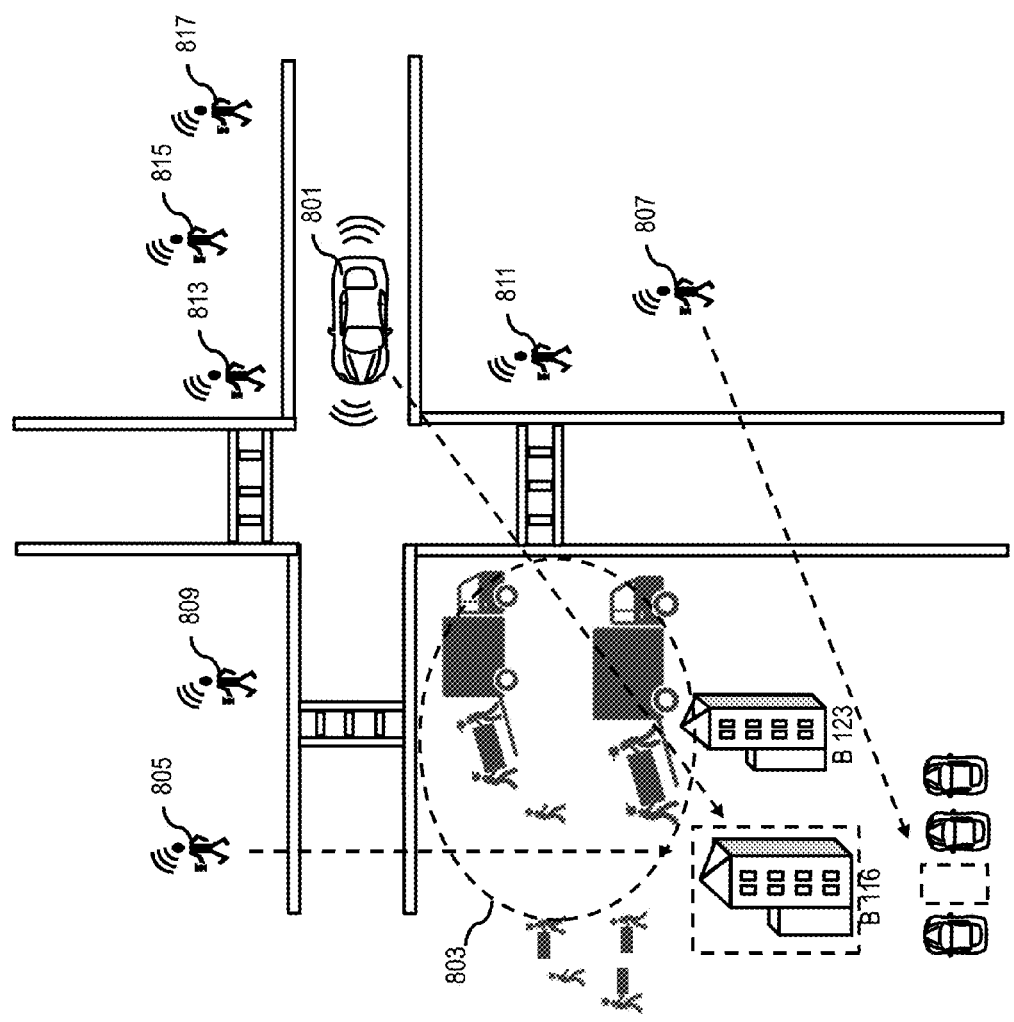
FIG. 8 represents a scenario wherein UE 101 associated with at least one driver and/or at least one vehicle is connected with the UE 101 of the nearby users (e.g., pedestrians) for navigational support, according to one example embodiment.

FIG. 8 represents a scenario wherein UE 101 associated with at least one driver and/or at least one vehicle is connected with the UE 101 of the nearby users (e.g., pedestrians) for navigational support, according to one example embodiment. In one scenario, the user of at least one vehicle 801 is driving towards destination B 116. The user notices that an area 803 nearby destination B 116 is under construction and is obstructing his/her line-of-sight. Such obstruction makes it difficult for the user to find the destination B 116. As a result, the user may activate the local support feature in his/her UE 101, whereupon the UE 101 of the user is connected with the UE 101 of the other users 805 and 809 proximate to the destination B 116. Then, the users of at least one vehicle 801 may send request via his/her UE 101 to other users 805 and 809 for navigational support towards destination B 116. The at least one user 805 amongst the other users may agree to support the user of at least one vehicle 801. The request sent by the user of at least one vehicle 801 may include specific requests (e.g., "Help me find destination B 116"), identification information of the at least one vehicle 801 (e.g., picture of the vehicle, model number of the vehicle, color information, etc.), or a combination thereof. Similarly, the at least one other user 805 may share his/her location information (e.g., position information), identification information (e.g., pictures, any recognizable item he/she is wearing or carrying (e.g., colorful jackets, caps, umbrella, etc.), connected wearable devices, etc.). Subsequently, the user of at least one vehicle 801 may slow down upon identifying the at least one other user 805, whereupon at least one other user 805 may assist the user towards destination B 116 via gesture or any other means of communication (e.g., laser display, voice commands, etc.). Then, the user of at least one vehicle 801 may drive towards the indicated direction to reach the destination B 116. However, the driver of at least one vehicle 801 also needs to park his/her vehicle, and the likelihood of the parking location being blocked by the construction is very high. As a result, the user of at least one vehicle 801 may send a parking request to other users 807 and 811 proximate to the parking location. The parking request may include identification information (e.g., vehicle specifications), temporal information (e.g., time period for parking the vehicle) etc. Then, at least one user 807 amongst the other users may agree to assist the user of at least one vehicle 801 in finding a suitable parking space. In one scenario, the at least one user 807 may highlight on his UE 101 a street which is usually not too crowded and has free parking. Then, the at least one user 807 may transfer this information to the UE 101 of the user of at least one vehicle 801. Such local guidance can provide dynamic and accurate information about the availability of parking spaces. In one scenario, since multiple users are ready to support the user of at least one vehicle 801, the user of at least one vehicle 801 alongside the passenger may have several channels of discussion open to deal with the questions.

Figure 9:
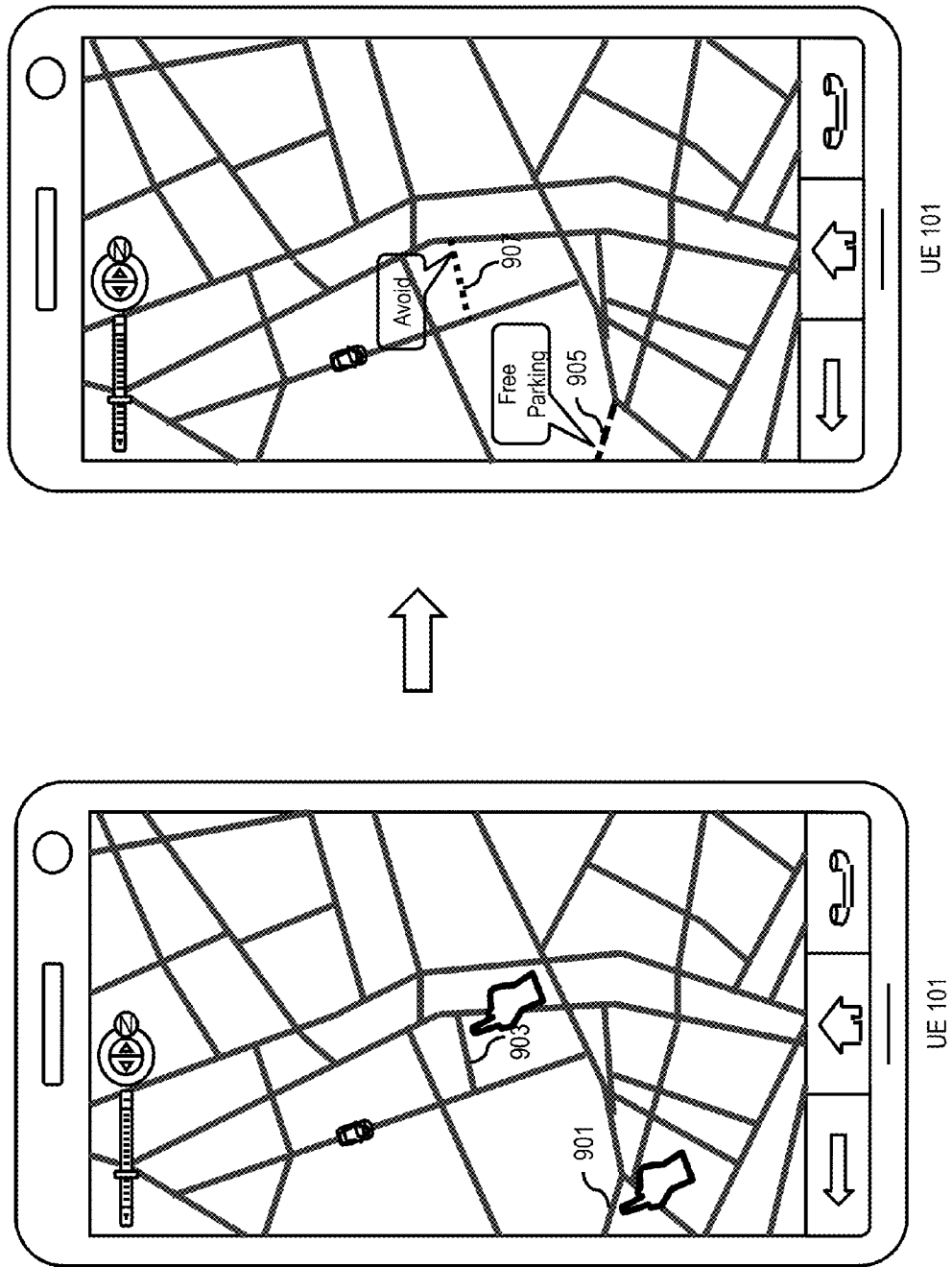
FIG. 9 is a user interface diagram that represents a scenario wherein local navigation assistance is provided via at least one UE 101 of a user proximate to a destination, according to one example embodiment.

FIG. 9 is a user interface diagram that represents a scenario wherein local navigation assistance is provided via at least one UE 101 of a user proximate to a destination, according to one example embodiment. In one scenario, the user of at least one vehicle need not meet the at least one other user providing navigational guidance. The at least one other user providing navigational guidance may highlight street 901 in his/her UE 101 that is usually not too crowded and has free parking. This information may be transmitted and displayed in the UE 101 of the user of at least one vehicle, wherein the street 905 with free parking may be highlighted with a message notification. In addition, at least one other user providing navigational guidance may highlight street 903 that should be avoided because of heavy traffic. This information may be transmitted and displayed in the UE 101 of the user of at least one vehicle, wherein the street 907 is highlighted with a message notification. As a result, the user of at least one vehicle can avoid street 907 and save time while reaching his/her destination.

Figure 10:
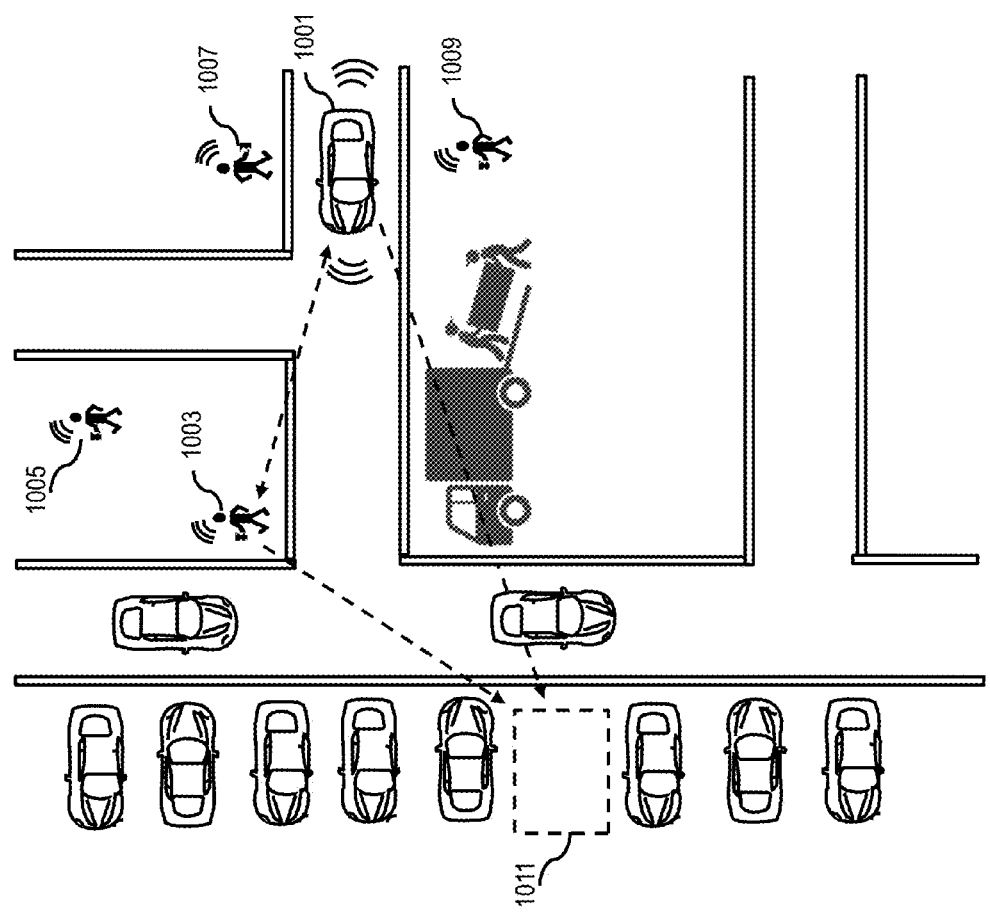
FIG. 10 represents a scenario wherein notifications are sent to the most relevant users from a group of users, according to one example embodiment.

FIG. 10 represents a scenario wherein notifications are sent to the most relevant users from a group of users, according to one example embodiment. In one scenario, the configuration platform 109 may select one or more users based, at least in part, on proximity information, user's knowledge regarding the area, number of times the user has helped in the past, or a combination thereof. In one example embodiment, when a driver 1001 makes a request for navigational support towards a parking location, the configuration platform 109 may search for users around the parking area. The configuration platform 109 may find multiple users 1003, 1005, 1007, 1009 nearby the parking location, and may forward the request to the most relevant users. The configuration platform 109 may select user 1003 because he/she is closest to the parking area and has a clear line-of-sight. On the other hand, the configuration platform 109 may also select user 1005 because he/she has very good knowledge of the area. In addition, the configuration platform 109 may also select user 1007 because he/she has assisted several other users in the past. Subsequently, the configuration platform 109 may forward the navigational requests to the selected users 1003, 1005 and 1007. Once the selected users accept the request, the configuration platform 109 may stop sending notifications to the remaining users. However, if the selected users reject the request, the configuration platform 109 may continue sending notifications to the remaining users until some threshold of proximity or relevance is reached.

The processes described herein for connecting at least one first device with at least one second device proximate to at least one destination for navigation guidance may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
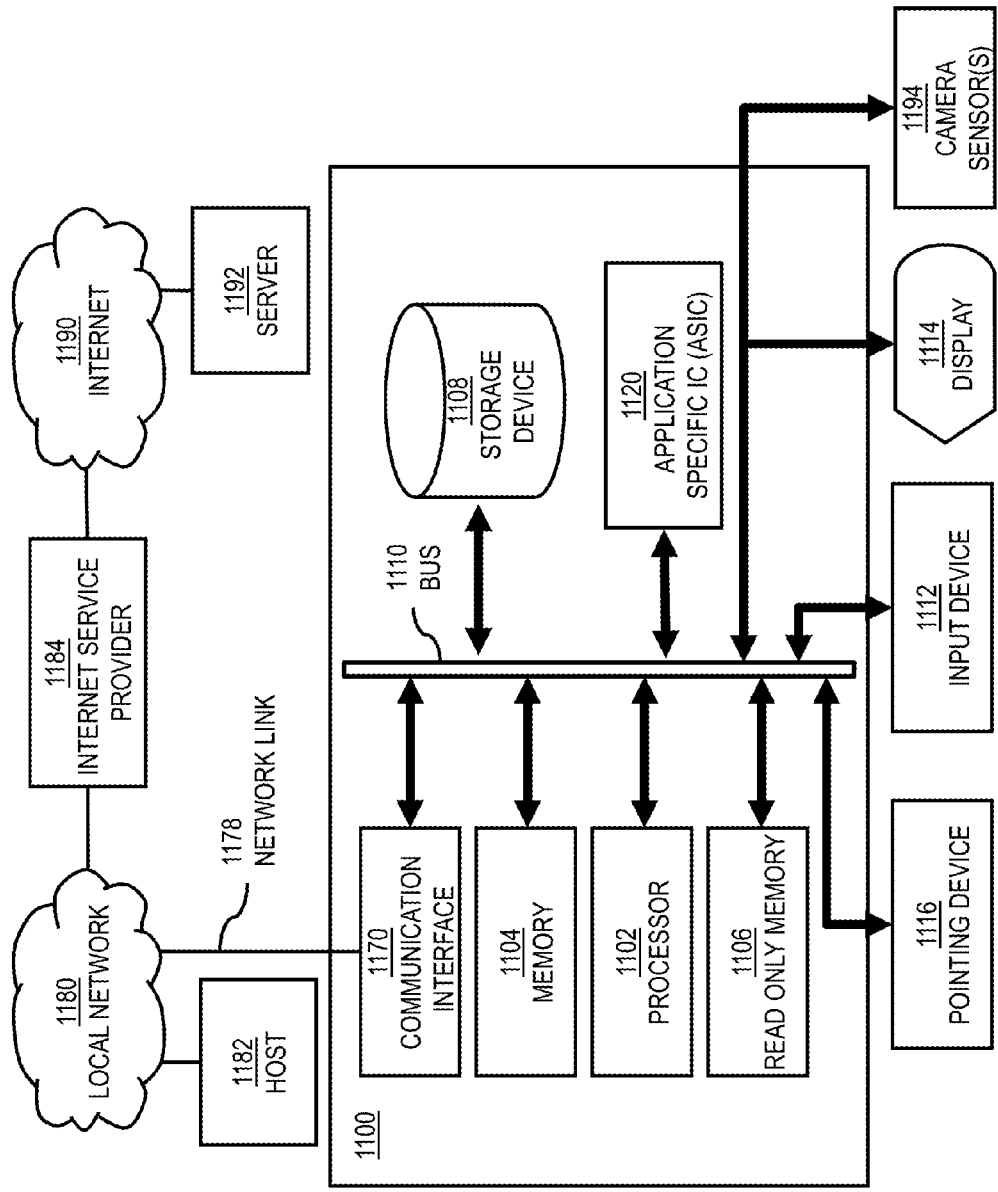
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to connect at least one first device with at least one second device proximate to at least one destination for navigation guidance as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of connecting at least one first device with at least one second device proximate to at least one destination for navigation guidance.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to connect at least one first device with at least one second device proximate to at least one destination for navigation guidance. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for connecting at least one first device with at least one second device proximate to at least one destination for navigation guidance. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for connecting at least one first device with at least one second device proximate to at least one destination for navigation guidance, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for connecting at least one first device with at least one second device proximate to at least one destination for navigation guidance to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to connect at least one first device with at least one second device proximate to at least one destination for navigation guidance as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of connecting at least one first device with at least one second device proximate to at least one destination for navigation guidance.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to connect at least one first device with at least one second device proximate to at least one destination for navigation guidance. The memory 1205 also stores the data associated with or generated by the execution of the inventive steps.

Figure 13:
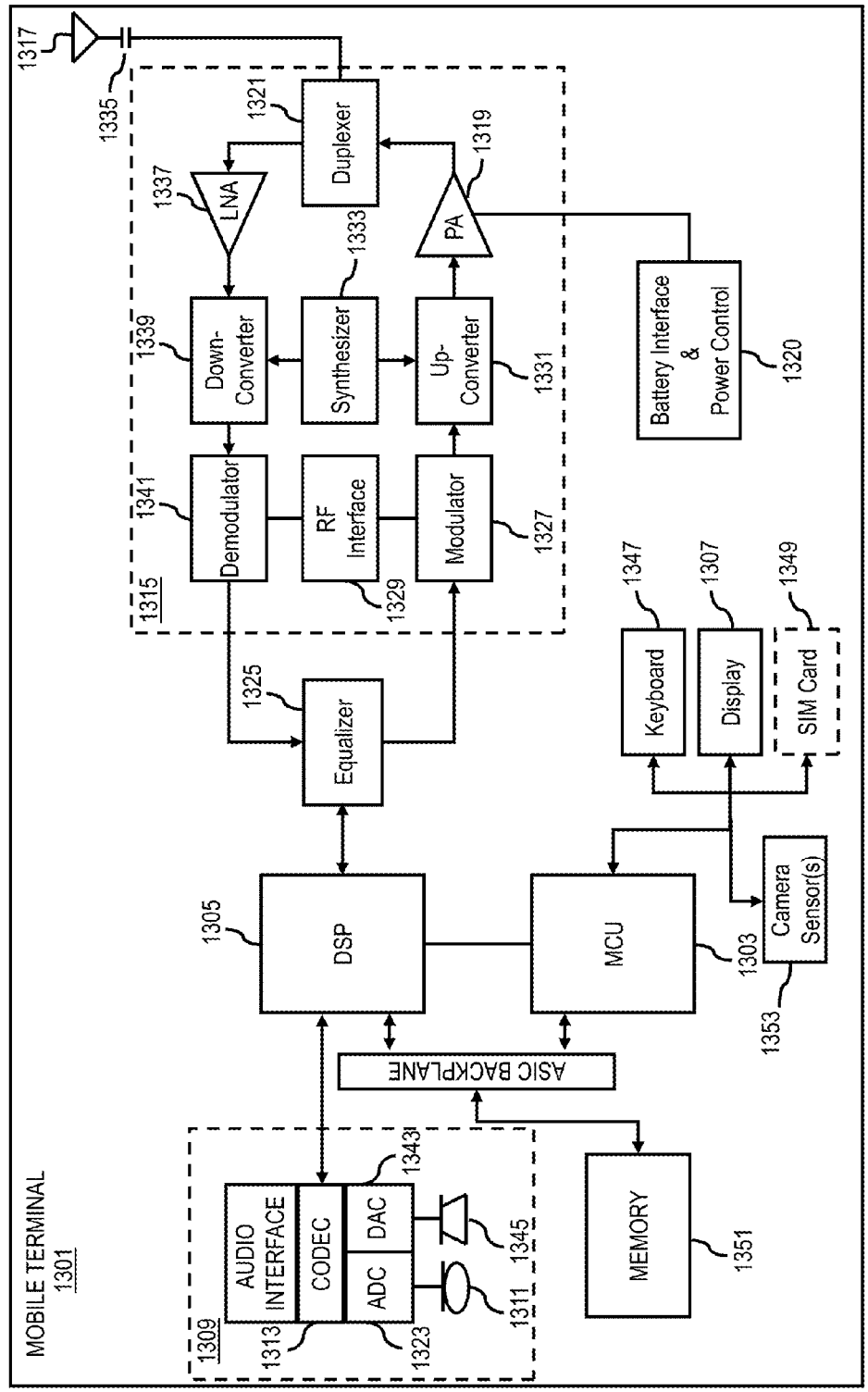
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of connecting at least one first device with at least one second device proximate to at least one destination for navigation guidance. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of connecting at least one first device with at least one second device proximate to at least one destination for navigation guidance. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to connect at least one first device with at least one second device proximate to at least one destination for navigation guidance. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet.

The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of connecting a first device associated with a first user with a second device associated with a second user that is proximate to a destination, for navigation guidance, comprising:
receiving at an configuration server a navigation assistance request from the first device sent over a communication network, the navigation assistance request including destination information of the destination, the configuration server comprising a processor and a memory, wherein the processor:
determines the second user associated with the second device based on the second user being within a proximity threshold of the destination;
transmits the navigation assistance request from the first device to the second device associated with the second user; and
causes display of navigation guidance information related to the destination provided by the second user at a display of the first device associated with the first user who seeks the navigational guidance information,
wherein the second user is a pedestrian, and
wherein the navigation guidance information related to the destination that the first user seeks includes a main entrance associated with the destination, a parking location associated with the destination, an area to avoid when arriving at or leaving the destination, and a parking area to avoid at the destination.

2. The method of claim 1,
wherein the navigation assistance request further includes first identification information associated with at least one of the first user and the first device, and
wherein the first identification information includes at least one of (i) descriptive text and (ii) at least one image of at least one of the first device, the first user, and a vehicle associated with the first user.

3. The method of claim 2,
wherein a response to the navigation assistance request includes second identification information associated with at least one of the second device and the second user; and
wherein the second identification information includes at least one of (i) descriptive text and (ii) at least one image of at least one of the second device and the second user.

4. The method of claim 1, wherein the processor further establishes at least one communication session between the first device and the second device,
wherein the at least one communication session is for conveying the navigation guidance information for identifying at least one of the first device, the first user, the second device, and the second user.

5. The method of claim 4, wherein the navigation guidance information comprises a shared mapping user interface including information annotated by the at least one of the first device, the first user, the second device, and the second user.

6. The method of claim 4, wherein the at least one communication session is established using at least one of local connectivity and wide area connectivity.

7. The method of claim 1, wherein the processor further:
determines at least one of (i) at least one respective candidate device and (ii) at least one respective candidate user within the at least one proximity threshold; and
selects at least one of the second device and the second user from among the at least one of (i) at least one respective candidate device and (ii) at least one respective candidate user based on at least one selection criteria,
wherein the at least one selection criteria include at least one of a proximity criterion, a previous experience criterion, and an area familiarity criterion.

8. The method of claim 7, wherein the processor further:
recursively sends a participation request to at least one of the (i) at least one respective candidate device and the (ii) at least one respective candidate user until at least one of the (i) at least one respective candidate device and the (ii) at least one respective candidate user accepts the participation request; and
designates as the second device at least one respective candidate device that accepts the participation request.

9. The method of claim 1, wherein the processor further:
determines that (i) at least one of the first device and the first user, and (ii) at least one of the second device and the second user are within at least one distance threshold; and
processes at least one of location information and mapping information, to generate a line-of-sight indication for identifying at least one of the first device, the first user, the second device, and the second user.

10. A non-transitory computer-readable storage medium carrying one or more sequences of one or more instructions stored thereon executed by a processor to perform a method of connecting a first device associated with a first user with a second device associated with a second user that is proximate to a destination, for navigation guidance, the method comprising:
receiving a navigation assistance request from the first device sent over a communication network, the navigation assistance request including destination information of the destination;

determining the second user associated with the second device based on the second user being within a proximity threshold of the destination;

transmitting the navigation assistance request from the first device to the second device associated with the second user; and displaying navigation guidance information related to the destination provided by the second user at a display of the first device associated with the first user who seeks the navigational guidance information, wherein the second user is a pedestrian, and wherein the navigation guidance information related to the destination that the first user seeks includes a main entrance associated with the destination, a parking location associated with the destination, an area to avoid when arriving at or leaving the destination, and a parking area to avoid at the destination.

11. The non-transitory computer-readable storage medium of claim 10, wherein the navigation assistance request further includes first identification information associated with at least one of the first user and the first device, and wherein the first identification information includes at least one of (i) descriptive text and (ii) at least one image of at least of the first device, the first user, and a vehicle associated with the first user.

12. The non-transitory computer-readable storage medium of claim 11, wherein a response to the navigation assistance request includes second identification information associated with at least one of the second device and the second user; and wherein the second identification information includes at least one of (i) descriptive text and (ii) at least one image of at least of the second device and the second user.

13. The non-transitory computer-readable storage medium of claim of claim 10, wherein the method further comprises:

establishing at least one communication session between the first device and the second device, wherein the at least one communication session is for conveying the navigation guidance information for identifying at least one of the first device, the first user, the second device, and the second user.

14. The non-transitory computer-readable storage medium of claim 13, wherein the navigation guidance information comprises a shared mapping user interface including information annotated by the at least one of the first device, the first user, the second device, and the second user.

15. The non-transitory computer-readable storage medium of claim 13, wherein the at least one communication session is established using at least one of local connectivity and wide area connectivity.

16. The non-transitory computer-readable storage medium of claim of claim 10, wherein the method further comprises:

determining at least one of (i) at least one respective candidate device and (ii) at least one respective candidate user within the at least one proximity threshold; and selecting at least one of the second device and the second user from among the at least one of (i) at least one respective candidate device and (ii) at least one respective candidate user based on one or more selection criteria, wherein the at least one selection criteria include at least one of a proximity criterion, a previous experience criterion, and an area familiarity criterion.

17. The non-transitory computer-readable storage medium of claim 16, wherein the method further comprises:

recursively sending a participation request to at least one of the (i) at least one respective candidate device and the (ii) at least one respective candidate user until at least one of the (i) at least one respective candidate device and the (ii) at least one respective candidate user accepts the participation request; and designating as the second device at least one respective candidate device that accepts the participation request.

18. The computer-readable storage medium of claim 10, wherein the method further comprises:

determining that (i) at least one of the first device and the first user, and (ii) at least one of the second device and the second user are within at least one distance threshold; and processing at least one of location information and mapping information, to generate a line-of-sight indication for identifying at least one of the first device, the first user, the second device, and the second user.

* * * * *